United States Patent [19]

Hansen et al.

[11] 4,412,137

[45] Oct. 25, 1983

[54] DUAL VOLTAGE ENGINE STARTER MANAGEMENT SYSTEM

[75] Inventors: James E. Hansen, Oak Creek; Richard G. Smith, Milwaukee, both of Wis.

[73] Assignee: Eaton Corporation, Cleveland, Ohio

[21] Appl. No.: 449,072

[22] Filed: Dec. 13, 1982

[51] Int. Cl.[3] ........................ B62D 45/00; H02G 3/00

[52] U.S. Cl. .............................. 307/10 R; 123/179 B; 307/71

[58] Field of Search ..................... 307/9, 10 R, 44, 71, 307/77, 80, 140; 123/179 R, 179 A, 179 B

[56] References Cited

U.S. PATENT DOCUMENTS

| | | | |
|---|---|---|---|
| 2,729,750 | 1/1956 | Draper et al. | 307/10 R |
| 2,835,826 | 5/1958 | Vadas | 307/10 R |
| 2,895,057 | 7/1959 | Coughlin | 307/10 R |
| 2,926,266 | 2/1960 | Porter | 307/10 R |
| 2,930,901 | 3/1960 | Freeman | 307/10 R |
| 3,029,301 | 4/1962 | Strider | 307/71 |
| 3,778,632 | 12/1973 | Sarbacher | 290/50 |
| 3,871,383 | 3/1975 | Lee | 128/419 PS |
| 4,009,431 | 2/1977 | Johnson | 322/7 |
| 4,209,816 | 6/1980 | Hansen | 361/23 |
| 4,339,704 | 7/1982 | McSparran et al. | 307/71 |

*Primary Examiner*—Elliot A. Goldberg
*Assistant Examiner*—D. Jennings
*Attorney, Agent, or Firm*—C. H. Grace; W. A. Autio

[57] ABSTRACT

A dual voltage engine starter system having a first battery pack (B) for supplying power to the system and a second battery pack (A) and contactors (SC,PC) for connecting the battery packs in series mode for cold weather starting or in parallel mode for warm weather starting, a pilot relay (SPR) for controlling the standard start solenoid (SOL), and a starter contactor (SMC) that controls the starter motor (SM) circuit to protect the solenoid contacts (SOL1). A control logic system (FIGS. 2*a*-*b*) has a single timer (TMR) and a sequencing timer circuit (STC) for controlling the contactors and relay in particular sequences, both for high and low voltage start cycles and for starting and terminating start cycles. A low voltage detector (LVD) controls a start-terminate latch (STL) to abort the start cycle if the start motor (SM) voltage is too low. A frequency sensor (FS) sets the latch (STL) to end the starting cycle when the engine reaches running speed. A transfer detector (TD) sets the latch (STL) to abort the starting cycle if mode transfer is attempted during the starting cycle. Weld detectors (WDC) function at the end of the start cycle to prevent reclosing of the parallel contactor if either the series contactor or the pilot relay contacts (SC1, SC2, SPR1, SPR2) have failed to open. A low system voltage detector connects the series battery pack's voltage to the control system.

23 Claims, 3 Drawing Figures

DUAL VOLTAGE ENGINE STARTER MANAGEMENT SYSTEM

BACKGROUND OF THE INVENTION

Dual voltage engine starter systems have been known heretofore. For example, J. E. Coughlin U.S. Pat. No. 2,895,057, dated July 14, 1959, discloses an automatic switching apparatus whereby two 6-volt batteries may be automatically and temporarily switched from parallel connection to series connection for automobile starting purposes while simultaneously excluding other devices which are normally supplied with current by the batteries from receiving such boosted voltage during the starting interval. Also, J. W. Lee U.S. Pat. No. 3,871,383, dated Mar. 18, 1975, relates to a power supply system having two parallel connected batteries and includes circuit means responsive to the voltage across the output terminals of this power supply falling to a predetermined value for automatically connecting the batteries in series. While these dual voltage systems have been useful for their intended purposes, this invention relates to improvements thereover.

SUMMARY OF THE INVENTION

An object of the invention is to provide an improved dual voltage engine starter management system.

A more specific object of the invention is to provide a dual voltage engine starter management system with an improved high current and voltage interrupting interlocking contactor having a pair of interlocked contactor units one of which is used to connect a pair of batteries in parallel and the other one of which is used to connect such pair of batteries in series and the interlocking preventing simultaneous closure of the two units thereby avoiding short circuiting of one or the other of such batteries.

Another specific object of the invention is to provide a dual voltage engine starter management system capable of switching two 24-volt batteries or battery packs from parallel to series for a starting interval and including means for preventing the standard starter solenoid contacts from having to switch the 48-volts DC.

Another specific object of the invention is to convert or implement an engine starter system having a standard 24-volt starter solenoid switch into an improved 48-volt starting system without modification of the standard 24-volt starter solenoid switch.

Another specific object of the invention is to provide a dual voltage engine starter management system with improved low voltage sensing and lockout protection such that if the battery system voltage drops significantly during attempted starting and does not recover at a rate adequate to achieve starting, the system will abort the starting cycle before damaging starter solenoid chatter or door-belling can occur.

Another specific object of the invention is to provide a dual voltage engine starter management system with improved means for protection against starter overrun by stopping the starter operation in response to a run signal such as an engine RPM produced signal or other inhibit input.

Another specific object of the invention is to provide a dual voltage engine starter management system with an improved low voltage sensor for providing an inhibit signal which will stop the starting cycle in the event the battery voltage does not recover to a predetermined level within a predetermined time after the beginning of the starting cycle.

Another specific object of the invention is to provide a dual voltage engine starter system having a dual voltage mode selector switch with improved means for terminating the starting cycle in the event the starting voltage mode selector switch is transferred from one position to another during a starting cycle.

Another specific object of the invention is to provide a dual voltage engine starter system having contacts for connecting a pair of batteries in series for cold weather starting and contacts for connecting those batteries in parallel for running with improved means for sensing whether the series connecting contacts have welded and thus failed to open and for preventing closure of the parallel connecting contacts in response thereto thereby to prevent short circuiting of the batteries.

Another specific object of the invention is to provide a dual voltage engine starter system having contacts for connecting a pair of batteries in parallel normally and temporarily in series for starting as well as starter solenoid energizing contacts with improved means effective at the termination of the starting cycle for preventing closure of the parallel connecting contacts in the event the starter solenoid energizing contacts have welded and thereby failed to open.

Another specific object of the invention is to provide a dual voltage engine starter system having automatic electrical circuit means for performing an engine starting cycle in response to a start signal input with alternative start system override means for starting the engine under manual control as an alternative to the automatic means.

Another specific object of the invention is to provide a dual voltage engine starter system having a plurality of switches for connecting a pair of batteries in parallel for running and temporarily in series for engine starting and for energizing the starter solenoid and the starter motor with improved voltage sensing means effective in the event the normal supply voltage falls to a predetermined level during the starting interval for automatically connecting the higher starting voltage to at least a portion of said system.

Another specific object of the invention is to provide a dual voltage engine starter system having a plurality of electrical switches for connecting a pair of batteries in parallel for running and in series for starting the engine and for energizing the starter solenoid and the starter motor with improved timed sequencing means for energizing said switches in a particular order on a start cycle.

Other objects and advantages of the invention will hereinafter appear.

DESCRIPTION OF THE PREFERRED EMBODIMENT

Figure 1:
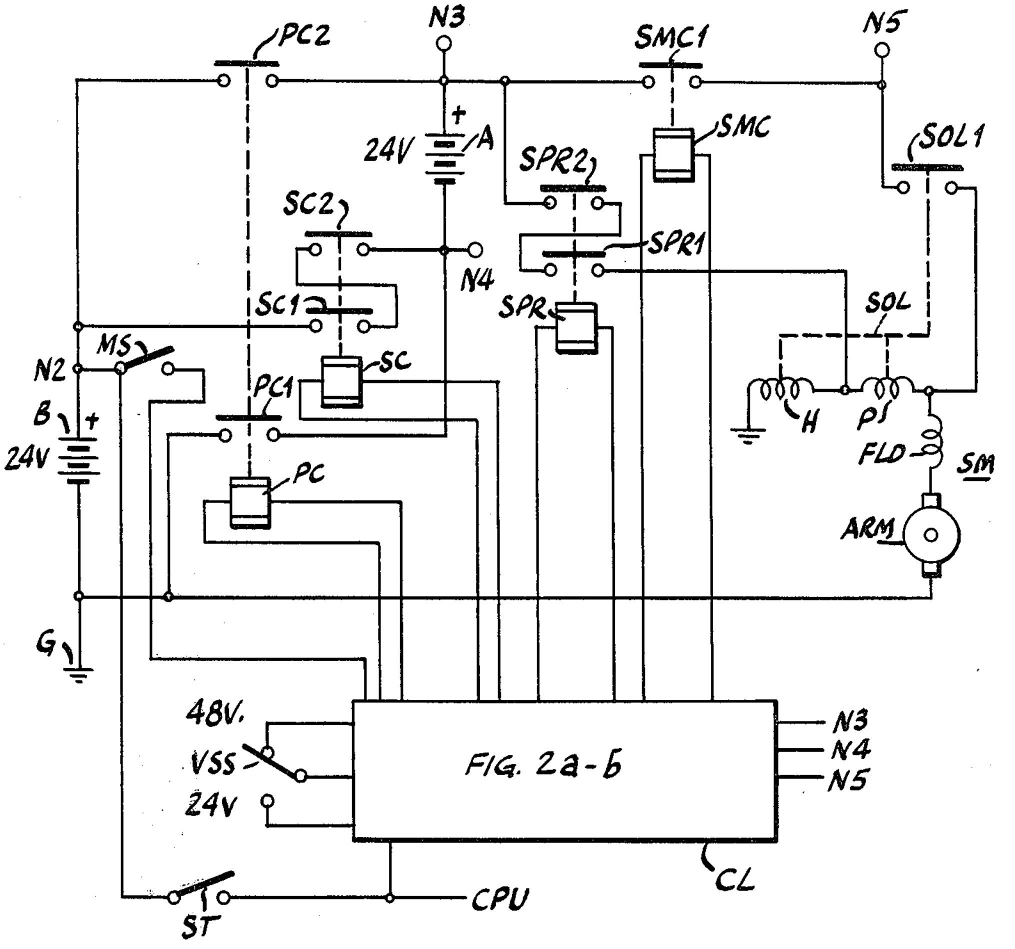
FIG. 1 is a circuit diagram partly in block form showing a dual voltage engine starter management system constructed in accordance with the invention; and FIGS. *2a–b* is a circuit diagram of a control logic circuit used in the system of FIG. 1 within the rectangle shown therein.

Referring to FIG. 1, there is shown a dual voltage engine starter management system constructed in accordance with the invention. As shown therein, this system is provided with a pair of 24-volt batteries or battery packs A and B which may be connected in parallel or in series to a starter motor SM for the purpose of starting the large internal combustion engine of a tank or the like, motor SM having an armature winding ARM and a series field winding FLD. As will be apparent, batteries A and B can be connected in parallel between ground and node N3 by energizing parallel contactor PC and closing its bridging contacts PC1 and PC2. On the other hand, batteries A and B can be connected in series between ground G and node N3 by energizing series contactor SC and closing its bridging contacts SC1 and SC2. Two bridging contacts SC1 and SC2 are used in series in this circuit to enable interruption of the high voltage of 48 volts DC and the high starting current, such high voltage being divided between the four breaks of bridging contacts SC1 and SC2. A starter pilot relay SPR when energized closes its bridging contacts SPR1 and SPR2 in series to complete a circuit from node N3 through pull coil P of starter solenoid SOL and starter motor SM to ground and in parallel therewith through hold coil A of starter solenoid SOL to ground. Starter solenoid SOL is a standard starter solenoid and upon energization closes its bridging contact SOL1 in the starter motor circuit. Being a standard starter solenoid, its bridging contacts SOL1 cannot safely handle the double voltage of 48 volts and the high current that is used for cold weather starting. To protect the standard starter solenoid contacts SOL1 under both the series battery and parallel battery connections, the system is provided with a starter motor contactor SMC having a double-break bridging contact SMC1 in series with starter solenoid contact SOL1 in the starter motor circuit. A master switch MS, when closed, provides supply voltage for the control logic circuit CL shown as a rectangle. Start switch ST, when closed, supplies a 24-volt start signal from battery B to control logic CL. Alternatively, a control signal may be supplied to control logic CL from a computer such as a central processing unit CPU as shown in FIG. 1. A voltage selector switch VSS is used to select either 48 volts in the position shown which will result in connection of batteries A and B in series after master switch MS and start switch ST are closed or 24 volts when moved to its other position wherein batteries A and B will be connected in parallel after master switch MS and start switch ST are closed as hereinafter described in more detail in connection with FIGS. 2*a–b*. In addition, in FIG. 1, nodes N3, N4 and N5 are connected to control logic CL, node N3 being at the positive side of battery A, node N4 being at the negative side of battery A and node N5 being between contacts SMC1 and SOL1, these three node connections being merely referenced rather than shown by lines therebetween to avoid complicating the drawing in FIG. 1.

The system in FIG. 1 is intended for use primarily on large diesel engines used on combat tanks and other strategic military vehicles. These engines, like all diesel engines, have had a history of starting problems at very low temperatures which is one of the reasons why a turbine engine has been considered as a substitute. However, the turbine also has its own problems so that it has become desirable to attempt to solve the internal combustion engine starting problem under very cold weather conditions.

The solution to the starting problem is to get the engine "cranked" to a sufficient RPM level to achieve a start condition. The cold temperature starting load of the huge engines is a formidable challenge for the starter motor and the battery pack. It has been found that if the battery packs could be temporarily and safely connected at a higher voltage such as a double voltage configuration instead of the normal 24-volt connection during the cranking interval, greater starter RPM could be attained in a shorter period of time permitting more positive starts. This must be done safely without damaging the standard apparatus already present on these large internal combustion engines such as, for example, the starting solenoid which has been previously designed for a lower voltage starting supply. For this purpose, it was found necessary to design a new contactor and control system which would provide the necessary switching, timing and coordination to configure the batteries to 48 volts and connect them to the starter motor on a cold start. This constituted quite a challenge for several reasons which can be summarized as follows: very high DC currents must be carried and switched, on the order of several thousand amperes peak. Switching, and particularly interrupting, DC voltages as high as 48 volts DC is very difficult and this is further complicated by the high current levels that must be switched. Because of the particular contact circuits required, it was necessary to provide means to prevent a combination of closed contacts which could short out the battery packs. Such a situation might be brought about by welded contacts remaining closed at a time when they must be open, shock or vibration, which is common in a tank, causing multiple contactor closures in an undesirable combination and possible malfunction of the controller circuit. Furthermore, it was learned that the standard starter including the starter solenoid could be operated at 48 volts DC provided it would not be allowed to "over-rev" once the engine was started, and if the starter solenoid contacts SOL1 would not have to do any actual switching of 48 volts DC. In addition to the foregoing, the system must operate with very severe voltage fluctuations (dips) which are caused by the extreme load currents and by the possibility that battery packs could be depleted. The system would have to detect such conditions and automatically turn off prior to contactor, starter motor, or system damage which could result from such low voltage, for instance, "door-belling" of the starter solenoid or contactors. The control logic shown in FIGS. 2*a–b*, when used to control the system of FIG. 1, meets the foregoing conditions as hereinafter described.

Figure 2A:
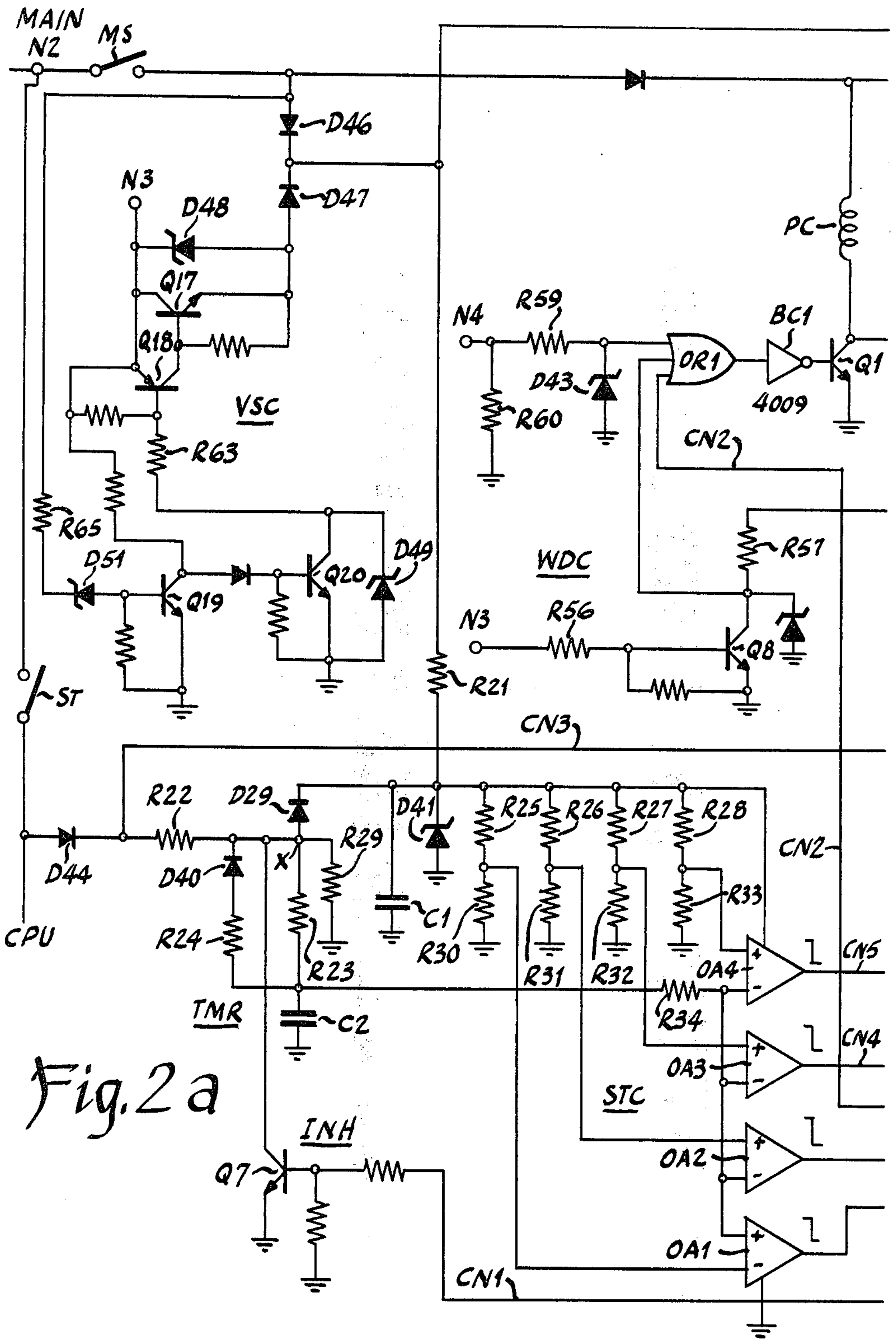
Figure 2B:
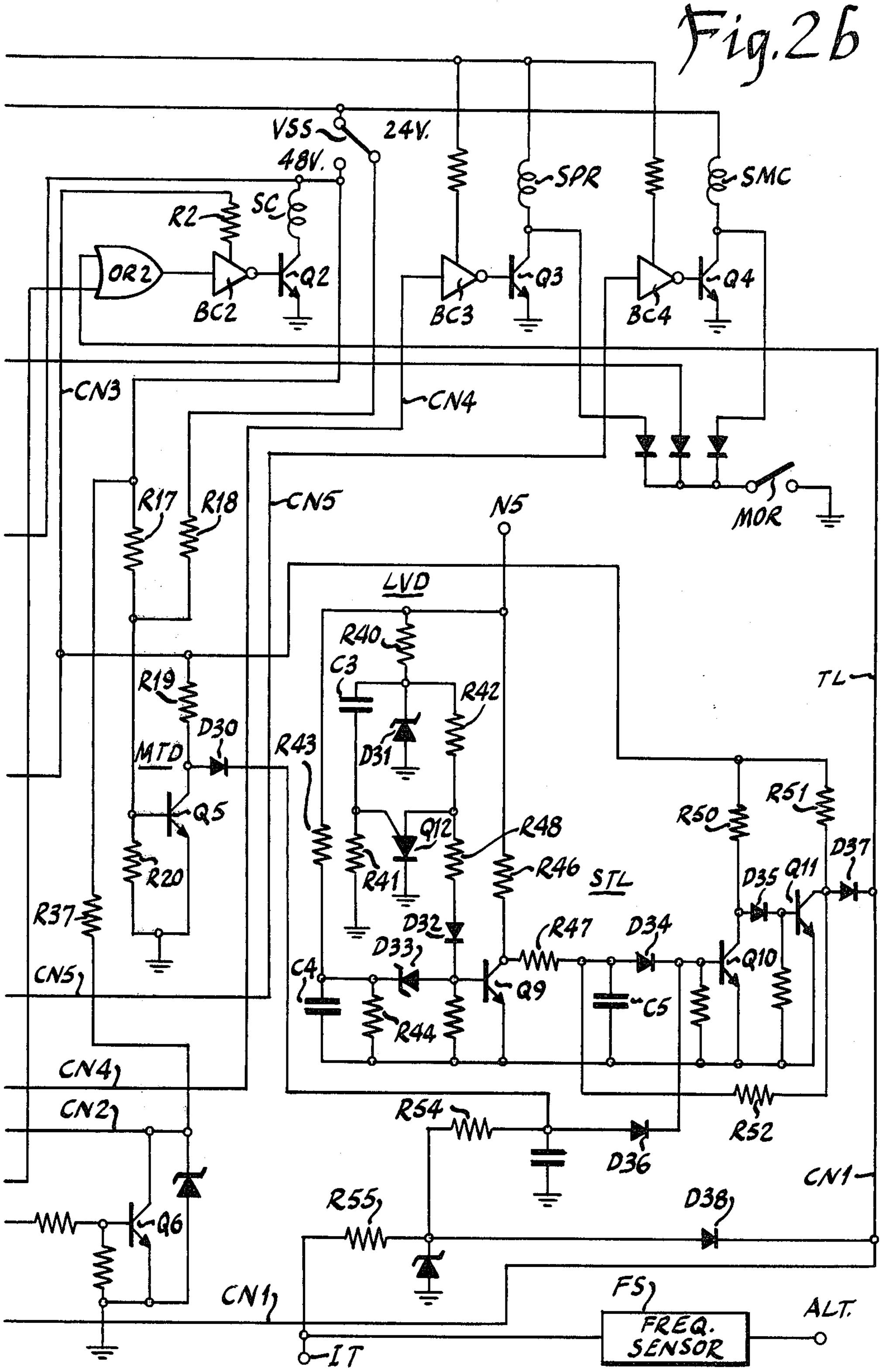

Referring to FIGS. 2*a–b*, the coil circuit of each contactor and relay, including parallel contactor PC, series contactor SC and starter motor contactor SMC and starter pilot relay SPR, is driven by a power driver circuit. The contactor PC driver circuit will be used to illustrate the operation of one of these coil driver circuits. Transistor Q1 is a high gain Darlington NPN power transistor used to switch the coil current. If the output of buffer/converter BC1 is high, transistor Q1 will be on and the coil of parallel contactor PC will be energized. Transistor Q1 is turned off whenever the output of buffer/converter BC1 goes low. The current gains of buffer/converter BC1 and transistor Q1 permit the relatively high coil current signals to be controlled by low level logic signals in the control circuit. Buffer/-converter BC1 is controlled by any one of three inputs to OR gate OR1. This OR gate isolates the three inputs from each other. Thus, any positive polarity signal into one of the three inputs of OR gate OR1 will cause the output of buffer/converter BC1 to go low which will turn off transistor Q1, thus deenergizing the coil of parallel contactor PC.

The driver circuit for the coil of series contactor SC has only two logic inputs to OR gate OR2 but further logic is performed by switching the base source current separately through resistor R2 to output transistor Q2.

The drivers for the coils of starter pilot relay SPR and starter motor contactor SMC have only one input each so that OR gates need not be used therein. The buffer/converters are well known and may be of the single transistor type, for example. The OR gates are also well known and may be of the diode combination or integrated circuit such as the 4071 type, for example.

The output drivers are controlled by logic signals from various portions of the control circuit such as by the sequencing timer circuit STC, the weld detector circuit WDC, the start command signal from start switch ST and the start terminate latch circuit STL.

Sequencing timer circuit STC at the lower portion of FIG. 2*a* comprises a 4-section operational amplifier including sections OA1-4 connected as a 4-level comparator, a regulated power supply at zener diode D41, a multiple reference voltage divider source at resistors R25–R28 and R30–R33, a timer TMR at capacitor C2 and resistors R22–R24, R29 and diode D40, and an inhibit circuit INH, which sequencing timer circuit functions as follows.

Zener diode D41 clamps a regulated voltage level of supply power to comparators OA1-4 and provides a stable voltage source for the reference voltage divider network. Zener diode D41 is a relatively low voltage zener, 7–8 volts, so that the main source voltage of 24 volts DC can dip significantly and still maintain bias to zener diode D41. Resistor R21 is a current limiting resistor between diode D41 and the main DC power source. Capacitor C1 is used as a noise and transient filter.

The comparator reference voltage divider resistors R25 and R30, R26 and R31, R27 and R32, and R28 and R33 provide four different voltage levels to the four comparator sections OA1-4.

Resistor R23 and capacitor C2 form an R-C charging network. The top of capacitor C2 is connected to the inputs of the four comparators through current limiting resistor R34. As capacitor C2 is charged from a zero voltage level upward, it will reach the toggle threshold of comparator OA1 first as this section has the lowest reference voltage on it, next section OA2, then section OA3 and finally section OA4. A time relationship between the toggling of each comparator section will result which is a function of how capacitor C2 charges and of the specific reference voltage level on each comparator. Thus, it is possible to provide a sequential timer with such an arrangement. The outputs of the various comparators are then connected to the various relay coil driver circuits to switch the relays as hereinafter more fully described.

The actual signal to charge the R-C timer circuit is supplied from the main DC source at node N2 through start switch ST to the anode of diode D44 which is an isolation diode. This signal is fed through resistor R22 to the R23-C2 timer network. The value of resistor R22 is much less than resistor R23 and does not alter the R-C charge rate. Actually resistor R22 is only a current limiting resistor. Diode D29 clamps the incoming start command signal to a regulated level by feeding current into the supply regulator, zener diode D41, whereby the R-C charging rate is consistent.

Termination of the start signal will result in the discharging of capacitor C2 back through resistors R23 and R29 to ground. The discharge rate of this capacitor is speeded up somewhat by resistor R24 which also carries discharge current therethrough and through diode D40 which is now forward biased. It is apparent that the discharge rate could be made faster or slower than the charge rate, depending upon what values are used for resistors R29 and R24. The discharge of capacitor C2 will, of course, reverse the sequence at which the four comparators OA1-4 are toggled back to their original states, and likewise the contactor and relay states.

Termination of the start condition can also be effected by providing an inhibit signal to the base of transistor Q7. This permits control circuit termination of the start sequence even if a start command signal still exists on the input. In this connection, resistor R22 prevents the collector of transistor Q7 from shorting the start signal to ground by limiting the current.

Further description of the sequencing timer circuit operation will be covered in a later description of the total control circuit through a typical operational sequence.

The start-terminate latch circuit STL and low voltage detector circuit LVD in FIG. 2*b* operate as follows. Normally, there is no supply bias voltage applied to the start-terminate latch circuit. When a start command signal is applied to the control system, bias voltage is supplied to the start-terminate latch circuit through resistors R50 and R51. Transistor Q11 initially turns on due to base bias through resistor R50 and diode D35. Capacitor C5, initially at zero charge, prevents or delays any bias voltage through resistor R52 from reaching the base of transistor Q10 until transistor Q11 is in an ON state whereupon the voltage through resistor R52 drops to ground. These two transistors Q10 and Q11 stay latched in this state until some sort of signal triggers the base of transistor Q10 on at which time transistor Q11 will be turned off. Any such trigger will cause the two transistors Q10 and Q11 to now latch in this state and they will stay this way until bias to resistors R50 and R51 is removed, that is, the start signal is turned OFF. This state, with transistor Q11 latched off, will produce a positive voltage at the anode of diode D37 which will propagate an inhibit signal through conductor CN1 to the sequencing timer circuit and also through trip line TL to the series contactor SC driver circuit, causing the series contactor SC driver to turn off even prior to the delayed off signal from the sequencing timer.

The low voltage sensor circuit LVD will now be described. Referring to FIG. 1, it will be seen that node N5 has voltage thereon only when the contactors and relay are closed into a starter cranking state. Upon initial application of power to the starter motor SM, the locked rotor current will be extremely high, approximately 4,000 amperes and will drop the battery voltage briefly to a low level. As the starter motor begins to rotate, the current will begin to reduce and the battery voltage will rise. For example, it has been determined that, if the batteries do not recover to at least 12 to 13 volts within approximately one-half second after initial application of power to the starter motor, the batteries have insufficient capacity to crank the starter to an adequate speed to start the engine. In such event, under those conditions, the start cycle should be automatically aborted before the starter solenoid has had time to chatter or "doorbell" and weld its contacts or cause other starter damage commonly associated with attempted starting with low batteries. This consideration applies whether starting is attempted at 24 volts under normal warm weather conditions or at 48 volts under cold weather conditions. For the aforesaid automatic aborting purpose, the low voltage detector LVD or sensor circuit funtions to measure the voltage at the starter motor node N5 and to trigger the start-terminate latch circuit STL if the voltage does not exceed 12.5 volts DC, for example, after one-half second of cranking. While such voltage level and cranking time period have been taken as exemplary, it will be apparent that other voltage levels and other cranking time periods may be suitable under other conditions. What actually happens is that, when starter motor contactor SMC closes cranking power to the starter circuit, node N5 receives a positive voltage. This positive voltage in FIG. 2*b*, in turn, initiates operation of the one-half second timer in LVD comprising resistors R40, R41, R42 and R48, capacitor C3, diodes D31 and D32 and programmable unijunction transistor Q12. Regulated voltage for the timer is provided by current limiting resistor R40 and zener diode D31. This voltage level is low, approximately 7.5 volts DC, so that drastic dips in system voltage will not perturb the timer voltage. Programmable unijunction transistor Q12 has its anode biased to a reference voltage by the divider action of resistors R42 and R48. The timer controlling elements are resistor R41 and capacitor C3, the junction of which is connected to the gate of transistor Q12. When power is first applied to node N5, capacitor C3 is at a zero charge level, whereby the gate of transistor Q12 is above the anode potential and transistor Q12 is in an off state. As capacitor C3 charges, the gate voltage of transistor Q12 drops and when it reaches the level of the anode voltage, the anode to cathode of transistor Q12 turns on, resulting in the anode dropping to near the cathode voltage level or ground. The values of resistor R41 and capacitor C3 are chosen to produce a one-half second delay to trigger transistor Q12. Prior to transistor Q12 turning on, the reference voltage divider branch of resistors R42 and R48 had current flowing through it and through diode D32 into the base of transistor Q9, keeping transistor Q9 turned on. When transistor Q12 turns on as hereinbefore described, the current is diverted from resistor R48 through transistor Q12 to ground. Therefore, this source of transistor Q9 base current turns off. At the end of the one-half second time interval following application of power to node N5, the voltage at the node N5 must be sufficiently high to forward-bias zener diode D33 into the base of transistor Q9 or, if not, transistor Q9 will turn off. In this manner, an undesirable condition of low voltage lasting more than one-half second is detected and will cause transistor Q9 to turn off. If this happens, that is, transistor Q9 turns off, current will be fed from node N5 through resistors R46 and R47 and diode D34 into the base of transistor Q10 to turn it on. When this happens, this latch circuit will trip and the start cycle will be terminated. For this purpose, transistor Q10 turning on as aforesaid causes transistor Q11 to turn off whereupon a positive voltage is applied through diode D37 and trip line TL to one input of OR gate OR2 which causes the output of buffer/converter BC2 to go low and turn off transistor Q2. As will be apparent, transistor Q2 turning off will deenergize the coil of series contactor SC thereby terminating the engine start cycle. The values of resistors R43 and R44 are selected to bias zener diode D33 on at the desired low voltage threshold as described above. Capacitor C4 acts ar a noise filter for short duration voltage spikes to prevent the sensor from nuisance tripping. Also, an inhibit signal will be transmitted through conductor CN1 to discharge timer capacitor C2 and open contactor SMC and relay SPR and reclose contactor PC in timed sequence. If the batteries were in good enough shape to have node N5 above 12.5 volts DC after one-half second of cranking, the cranking will be allowed to continue until either the start signal is turned off or a different signal is applied to the inhibit input of the latch circuit. Such a signal could be supplied, for example, by a frequency sensor FS indicating that the engine is now running and that the starter should be disengaged before it is overrun. Frequency sensor FS may, for example, sense the frequency of an alternator ALT driven by the engine as it is running such as is disclosed in James E. Hansen U.S. Pat. No. 4,209,816, dated June 24, 1980, assigned to the assignee of this invention. Alternatively, any other inhibit signal may be applied to inhibit terminal IT in place of frequency sensor FS or in addition thereto.

Another circuit which can terminate the starting cycle and which is coupled to the start-terminate latch circuit STL comprises mode transfer detector MTD including transistor Q5, diode D30 and resistors R17, R18, R19 and R20 in FIG. 2*b*. This circuit detects whether the start voltage mode select switch VSS is transferred from one position to the other in the middle of or during a start cycle, which is prohibited. If that should inadvertently be done, there will be a brief period of time during switch VSS transfer from one contact to another when neither the 24-volt nor the 48-volt side of the switch is biased by the armature of the switch. As a result, no voltage will be applied through either resistor R17 or resistor R18 to the base of transistor Q5 and this transistor will turn off. Though this is a brief time interval, nevertheless, it is long enough so that a high pulse is coupled from the collector of transistor Q5 through isolation diode D30 and diode D36 to the inhibit input of the start-terminate latch circuit STL which will terminate the start cycle in the manner hereinbefore described. The collector circuit of transistor Q5 is biased with a voltage through resistor R19 only when the start command signal is on so that this circuit is only "armed" during this time. The aforementioned start cycle terminating means function during both the series and parallel batteries starting modes, the inhibit signals going through diode D38 as an OR gate with diode D37 to insure start termination if latch should malfunction.

Under certain conditions in the 48-volt start mode, it is possible for the electronic control circuit to detect whether certain contactors have welded and, if so, the control circuit will prevent reclosure of other contacts in order to prevent undesirable results. For example, referring to FIG. 1, if during a 48-volt cranking cycle series contactor SC somehow welds, it is apparent that it would not be desirable or safe to reclose parallel contactor PC. This is for the reason that such reclosure would result in a short circuit of batteries A and B. Although a mechanical interlock as hereinbefore mentioned is provided on the series and parallel contactors to prevent this, it would also be desirable to inhibit reenergization of the coil of parallel contactor PC. This is accomplished with the control logic circuit of FIG. 2 by sensing the state of node N4 when terminating a 48-volt start cycle. If node N4 remains high, above ground, after series contactor SC has supposed to have opened, then the conacts of series contactor SC must be welded. Under these conditions, referring to FIG. 2*a*, OR gate OR1 receives a high at its upper input from node N4 which causes the output of buffer/converter BC1 to go low, thereby keeping transistor Q1 turned off to inhibit energizing the coil of parallel contactor PC.

Another weld sense method is used to detect welding of the starter pilot relay SPR contacts during a 48-volt start cycle. This is accomplished by detecting the state of node N3 when terminating the 48-volt starting sequence. First series contactor SC opens, then start motor contactor SMC opens and finally starter pilot relay SPR opens. If all these have opened, node N3 should be electrically floating as well as node N4. As shown in FIG. 2*a*, the control logic circuit provides a resistance path from node N4 through resistor R60 to ground which will virtually ground node N4 as far as control circuit impedancies are concerned. Since battery A is connected between nodes N4 and N3 as shown in FIG. 1 and N4 is virtually grounded, the voltage at node N3 is next sensed and if such voltage is present, it should bias on the base of transistor Q8 through resistor R56. If such voltage exists on node N3, transistor Q8 will be turned on and its collector will be low. Therefore, no bias voltage will be applied to the middle input of OR gate OR1 in FIG. 2*a*. If the other conditions are correct, that is, the other two inputs of OR gate OR1 are low, transistor Q1 will be turned on to energize parallel contactor PC, completing the parallel connection of the floating battery pack A with the main 24-volt battery pack B. If, however, starter pilot relay SPR contacts are welded at this time, node N3 will be at a low impedance to ground through hold coil H, transistor Q8 will be biased off and its collector load resistor R57 will apply a high to the middle input of OR gate OR1, preventing the closure of parallel contactor PC. In addition, in the event of a welded starter pilot relay SPR coming out of a 48-volt start mode, this sensing feature and the resultant prevention of reclosure of parallel contactor PC would prevent re-energization of the starter solenoid circuit on 24-volt DC by keeping node N3 open. This could temporarily prevent damage to the starter until the problem is corrected.

Normally, the control circuitry and contactor and relay coils are powered by the main 24-volt DC bus even when starting in the 48-volt mode. The 48-volt battery connection is applied only to the starter motor circuit. It has been found that if the main battery pack is weak, the 24-volt system voltage could drop to 5 volts DC or even lower. Under these conditions, it is considered desirable to apply the 48-volt DC connection, which under heavy loads could be down to 9 or 10 volts, into the control circuit to help assure adequate bias. A circuit for doing this is incorporated in the control logic of FIGS. 2*a–b* and is shown at the upper left-hand portion of FIG. 2*a*. The voltage of the main 24-volt bus is monitored by the circuit comprising transistor Q19, diode D51 and resistor R65. If the voltage drops below a level adequate to keep the base of transistor Q19 biased on by zener diode D51 and resistor R65, then transistor Q19 will turn off. This will cause transistor Q20 to be biased on and the low at its collector will then cause transistors Q18 and Q17 to turn on by drawing current through resistor R63. Transistors Q18 and Q17 will switch the voltage available at node N3, in the 48-volt mode it will be roughly double the main voltage level, into the control circuit helping to keep it biased until the main battery pack voltage recovers. Zener diodes D48 and D49 are transient protection for the switching transistors.

Having described the purpose and the function of the various individual circuits, the operation of the overall system shown in FIGS. 1 and 2*a–b* will now be described. A typical 48-volt start sequence or cycle would be initiated by closing master switch MS and placing the voltage selector switch VSS first into the 48-volt mode. This will apply bias voltage to the series contactor SC driver circuit but will not close this contactor yet and will also enable the starter pilot relay SPR weld sense circuit WDC by applying bias voltage to resistor R57. This will also apply bias voltage to resistor R37 at the left-hand portion of FIG. 2*b*, the purpose of which will be to open parallel contactor PC as hereinafter described. So far, nothing has happened to any of the contactors or relay. It will be apparent that parallel contactor PC is energized normally any time master switch MS is closed because all three inputs of OR gate OR1 are low. This keeps floating battery pack A in parallel with main battery pack B on the 24-volt main bus at node N2. Now, when a start signal is applied to the start input by closing start switch ST, junction X at the lower left-hand portion of FIG. 2*a* will be driven and clamped to the voltage level of zener diode D41 because diode D41 has already been biased ON through diode D46 and resistor R21 any time that master switch MS is closed. Timer capacitor C2 now charges from zero volts upward to the regulated level that appears on the upper end of resistor R23 at junction X. As capacitor C2 charges, it toggles the various comparators OA1-4 as its voltage passes the various reference levels at their non-inverting inputs. First, comparator OA1 switches from a high output level to a low output level. As a result, base drive to transistor Q6 is turned off and its collector goes high. Resistor R37 in the collector circuit of transistor Q was biased when selector switch VSS was placed in the 48-volt mode position. The input of the parallel contactor PC driver at the lower input of OR logic OR1 is now biased high through conductor CN2 and parallel contactor PC opens. This parallel contactor PC must be opened prior to closing series contactor SC to form the 48-volt series battery connection. Next in time, the output of comparator section OA2 switches low. This removes bias from the input to the series contactor SC driver at the lower input of OR gate OR2. Now, if no inhibit input is coming from trip line TL to the upper input of OR gate OR2, the output of buffer/converter BC 2 will go high to turn transistor Q2 on because resistor R2 receives direct bias voltage from the start command signal through conductor CN3 and will now bias transistor Q2 on, energizing series contactor SC. The 48-volt connection between node N3 and ground in FIG. 1 has now been established.

The next steps are to apply this power at node N3 to the starter motor. Comparator section QA3 is next to be toggled by the charging of capacitor C2. When the output of comparator OA3 goes low, through conductor CN4 it causes the output of buffer/converter BC3 to go high to turn transistor Q3 on and energize starter pilot relay SPR. This starter pilot relay then applies power to the actual starter motor solenoid in FIG. 1, engaging the starter gear and closing the starter solenoid contacts SOL1. Power has not yet been applied to the starter motor SM since starter motor contactor contacts SMC1 are still open. As hereinbefore mentioned, the starter solenoid contacts SOL1 cannot switch the 48-volt power since they are standard contacts suitable only for lower power but can carry the higher current if applied after the contacts are sealed closed. Finally, comparator OA4 in FIG. 2a is toggled by capacitor C2 reaching its reference level. The output of comparator OA4 goes low which, in turn, through conductor CN5 causes the starter motor contactor SMC driver to energize that contactor. For this purpose, the output of buffer/converter BC4 goes high to turn on transistor Q4 and energize the coil of starter motor contactor SMC. Sufficient time delay is allowed between the energizations of starter pilot relay SPR and starter motor contactor SMC by the reference voltage from divider R28, R33 to allow the starter solenoid to close and seal. Contacts SMC1 and SOL1 shunt pull coil P. This completes the energizing phase of the 48-volt mode start cycle. Starter motor contactor SMC now applies power to the starter motor SM and the engine begins to crank. Once starter motor contactor contacts SMC1 are closed to apply voltage to node N5, the low voltage sensor/timer LVD operation described earlier in connection with FIG. 2b is initiated. Assuming that the batteries potential at node N5 is above 12.5 volts within one-half second of SMC1 contacts' closure, low voltage detector LVD will permit the circuit to continue to crank the engine.

Termination of the cranking cycle can be accomplished in several ways: (1) When the engine RPM reaches a running level, a tachometer circuit causes an inhibit signal to appear at the inhibit input of the start-terminate latch circuit STL at the lower right-hand portion of FIG. 2b as hereinbefore described. (2) The low-voltage sensor or detector LVD at the center portion of FIG. 2b detects a low battery state and sets the latch STL to generate a trip signal. (3) The start command signal is removed by opening start switch ST. (4) Someone accidentally switches the voltage mode selection switch VSS at the upper portion of FIG. 2b from one state to the other. The above conditions (1), (2) and (4) cause the start-terminate latch circuit STL at the lower right-hand portion of FIG. 2b to latch a trip signal causing the trip line TL to go high. This immediately causes series contactor SC to open, interrupting the 48-volt circuit and terminating the cranking cycle. Although starter motor contactor SMC closed the 48-volt circuit, series contactor SC is used first to interrupt it as it has a quad-break, 4-contact interrupt action which is best suited to interrupting the 48-volt potential. The reason that starter motor contactor SMC is used is that the 48-volt circuit must be first established before starter pilot relay SPR can close the starter solenoid circuit and starter motor contactor SMC must hold power off to the starter motor circuit until the solenoid is seated. Series contactor SC was tripped open immediately by the trip line biasing the series contactor driver at the upper input of OR gate OR2. The trip signal on trip line TL also operates through conductor CN1 to bias transistor Q7 at the lower left-hand portion of FIG. 2a on, causing the high side of resistor R23 to switch low, thus discharging capacitor C2 and reversing the conditions of the comparators in the timer circuit, that is, reversing the timed sequence in which they function. For this purpose, comparator QA4 will revert to its original state first, opening starter motor contactor SMC. Then comparator section QA3 will revert, opening starter pilot relay SPR. Then comparator section OA2 will revert without effect, however, since series contactor SC was already opened directly by the trip signal. And finally comparator section OA1 will revert and cause parallel contactor PC to reclose, reconfiguring the floating battery pack back to a parallel state with the main 24-volt system. If the start command signal is still being held high with the bias voltage continuing to be applied through resistors R50 and R51, the start-terminate latch circuit STL will keep the control circuit latched in this off condition. Start signal will have to be removed and reapplied to reinitiate a cranking cycle. If the engine is running, the existence of a signal at the inhibit input IT from frequency sensor FS will prevent the start cycle from beginning.

Condition (3) above, removal of the start signal, will also terminate the cranking sequence but in a somewhat different manner. First, opening of start contact ST to remove the start signal will not cause the start-terminate latch circuit STL to trip. Series contactor SC will open immediately only because the series contactor driver circuit will loose base bias voltage to transistor Q2 by loss of current through conductor CN3 and resistor R2. The sequencer/timer circuit STC at the lower portion of FIG. 2a will go into reverse operation merely by removal of the bias voltage to the resistor R23 capacitor C2 network which will now discharge through resistor R29 to ground.

It will be apparent that one of the primary advantages of this sequential timer circuit STC design is that the sequencing of the contactors in a desired order is always guaranteed. If individual timers were used on the separate relay drivers, it might be possible to get these out of order by applying an intermittent start signal or interruptions in the middle of a cycle. Here, since all the sequencing is referred to one timing capacitor C2, the sequence will remain correct as well as the specific time delay relationships which had been determined and set beforehand.

During the 48-volt start sequence, if the main 24-volt system voltage drops below approximately 10 volts, the voltage sensing circuit VSC and switching circuit is used to steer the higher voltage at the series battery connection, node N3, into the control circuit to assure adequate voltage bias. This voltage sensing circuit VSC at the upper left-hand portion of FIG. 2a was described hereinbefore but, basically, when the 24-volt main bus voltage drops low, it is sensed by the transistor Q19 circuit which turns on transistors Q17 and Q18 which then steer the higher voltage at node N3 through diode D47 to the control circuit. It will be apparent that the contactor SC and SMC coil circuits do not receive this higher voltage, primarily because they are capable of retaining seal-down to approximately 2-volts and also because of their high coil current requirements, thereby avoiding the necessity of using a higher rating switch for transistors Q17 and Q18. If it became necessary, however, the coil circuits of contactors SC and SMC could also be provided with the boost voltage with the use of higher rating transistors in the voltage sensing circuit VSC.

The 24-volt sequence is simpler and will now be described. Initially, parallel contactor PC is energized as long as the master switch MS is closed and will remain energized because in the 24-volt mode, the two batteries A and B are kept in parallel. Parallel contactor PC is energized whenever the master switch MS is closed because all three inputs to OR gate OR1 are low. That causes the output of buffer/converter BC1 to go high to turn on transistor Q1 and energize parallel contactor PC. It will be observed that in the 24-volt setting of voltage selector switch VSS at the upper portion of FIG. 2*b*, resistor R37 is not biased and cannot turn off the parallel contactor PC driver when the timer-comparator section QA1 toggles. Thus, when the start signal is applied, capacitor C2 is charged as before but parallel contactor PC is not opened. Series contactor K2 is not closed when capacitor C2 reaches the toggle point of comparator section OA2 because the voltage select switch has removed all power to the series contactor SC coil circuit. When capacitor C2 reaches the comparator section OA3 toggle level, however, starter pilot relay SPR will be driven closed, energizing the starter solenoid SOL. The supply voltage at node N3 is, of course, at 24-volts now. Finally, after enough time has elapsed for the starter to engage and the solenoid to close, comparator section OA1 is toggled and starter motor contactor SMC closes, energizing the starter motor SM. Termination of the 24-volt start mode cycle by start switch or inhibit is much the same as for the 48-volt cycle except that only starter motor contactor SMC and then starter pilot relay SPR open in sequence. Also, in the 24-volt DC mode as well as in the 48-volt mode, the standard starter solenoid SOL has neither opened nor closed under load. Additional differences in the 24-volt start mode are that the weld detect circuits are not used and the voltage sense circuit VSC at the upper left-hand portion of FIG. 2*a* associated with switching transistors Q18 and Q17 will not operate because there is no step-up voltage in the system to be applied.

A manual override switch MOR is shown at the upper right-hand portion of FIG. 2*b*. This switch may be closed to initiate a 24-volt start cycle regardless of the lack of operation of the automatic system. When this manual override switch MOR is closed, the coils of parallel contactor PC, starter pilot relay SPR and starter motor contactor SMC are connected through respective diodes to ground to energize those coils and initiate the 24-volt start cycle in shunt of driver transistors Q1, Q3 and Q4, respectively. Or two manual override switches may be used to close parallel contactor PC and pilot relay SPR first and then close motor contactor SMC.

While the apparatus hereinbefore described is effectively adapted to fulfill the objects stated, it is to be understood that the invention is not intended to be confined to the particular preferred embodiment of dual voltage engine starter management system disclosed, inasmuch as it is susceptible of various modifications without departing from the scope of the appended claims.

I claim:

1. In a system for starting an internal combustion engine having a starter motor and a standard starter solenoid, the system comprising:

- a first battery for or battery pack for supplying operating power to the system;
- a second battery or battery pack;
- first electrically operable switching means for connecting said first and second batteries in parallel for normal starting;
- second electrically operable switching means for connecting said first and second batteries in series for cold weather starting;
- an electrically operable starter pilot switch in circuit with said batteries for energizing the standard starter solenoid;
- an electrically operable starter motor switch in circuit with said batteries for energizing the starter motor;
- means for operating said first switching means to connect said batteries in parallel;
- means for selecting a series or parallel batteries starting mode;
- means for applying a start signal;
- and control means operable when series batteries starting has been selected and responsive to said start signal for opening said first switching means and then closing in predetermined timed sequence said second switching means, said starter pilot switch and said starter motor switch in that order to apply power to the starter motor to initiate a high voltage starting cycle.

2. The internal combustion engine starting system claimed in claim 1, wherein said control means comprises:

- means responsive to termination of said start signal for immediately reopening said second switching means and thereafter reopening in predetermined timed sequence said starter motor switch and said starter pilot switch in that order and thereafter reclosing said first switching means to terminate said high voltage starting cycle.

3. The internal combustion engine starting system claimed in claim 1, wherein said control means comprises:

- a single timing device responsive to said start signal for developing an increasing operating signal;
- and a plurality of sequencing devices responsive to increasing levels of said operating signal for opening said first switching means and then closing said second switching means, said starter pilot switch and said starter motor switch in said predetermined timed sequence.

4. The internal combustion engine starting system claimed in claim 3, wherein:

- said single timing device comprises a resistance-capacitance timing circuit.

5. The internal combustion engine starting system claimed in claim 4, wherein said control means also comprises;

- means responsive to termination of said start signal for immediately reopening said second switching means and for discharging said capacitance at a preset timed rate to provide a decreasing control signal;
- and said plurality of sequencing means being responsive to said decreasing control signal for reopening said starter pilot switch and said starter motor switch in that order in a preset timed sequence.

6. The internal combustion engine starting system claimed in claim 2, wherein said control means further comprises:

- means operable after said termination of said start signal for sensing a predetermined abnormal condition;
- and means responsive to said sensing means for preventing said reclosing of said first switching means.

7. The internal combustion engine starting system claimed in claim 6, wherein:

- said predetermined abnormal condition is a failure of said second switching means to reopen in said sequence.

8. The internal combustion engine starting system claimed in claim 6, wherein:

said predetermined abnormal condition is a failure of said starter pilot switch to reopen in said sequence.

9. The internal combustion engine starting system claimed in claim 1, wherein said control means comprises:

means operable when parallel batteries starting has been selected and responsive to said start signal for maintaining said first switching means closed and closing in predetermined timed sequence said starter pilot switch and said starter motor switch in that order to apply power to the starter motor to initiate a low voltage starting cycle.

10. The internal combustion engine starting system claimed in claim 9, wherein said control means also comprises:

means operable after initiation of one of said starting cycles for sensing a predetermined operating condition of the system;

and means responsive to said sensing means for terminating said starting cycle.

11. The internal combustion engine starting system claimed in claim 10, wherein:

said predetermined operating condition is a running condition of the engine;

said sensing means comprises means for sensing the speed of the running engine and for providing a trip signal when said speed reaches a preset value;

and said terminating means responds to said trip signal to terminate said starting cycle.

12. The internal combustion engine starting system claimed in claim 11, wherein:

said termination of said starting cycle comprises applying said trip signal to open immediately said second switching means when series batteries starting has been selected and also applying said trip signal to said control means for reopening in predetermined timed sequence said starter motor switch and said starter pilot switch in that order and thereafter reclosing said first switching means to terminate said high voltage starting cycle.

13. The internal combustion engine starting system claimed in claim 11, wherein:

said termination of said starting cycle comprises applying said trip signal when parallel batteries starting has been selected to said control means for reopening in predetermined timed sequence said starter motor switch and said starter pilot switch in that order to terminate said low voltage starting cycle.

14. The internal combustion engine starting system claimed in claim 10, wherein:

said predetermined operating condition is a voltage condition of the power being applied to the starter motor;

said condition sensing means comprises means for sensing the voltage applied to the starter motor and for providing a time delay for such voltage to recover to a predetermined value indicative of sufficient battery capacity for cranking the engine and for providing a trip signal if said applied voltage does not have a value at or above said predetermined value at the end of said time delay;

and said terminating means responds to said trip signal to terminate said starting cycle.

15. The internal combustion engine starting system claimed in claim 14, wherein:

said termination of said starting cycle comprises applying said trip signal to open immediately said second switching means when series batteries starting has been selected and also applying said trip signal to said control means for reopening in predetermined timed sequence said starter motor switch and said starter pilot switch in that order and thereafter reclosing said first switching means to terminate said high voltage starting cycle.

16. The internal combustion engine starting system claimed in claim 14, wherein:

said termination of said starting cycle comprises applying said trip signal when parallel batteries starting has been selected to said control means for reopening in predetermined timed sequence said starter motor switch and said starter pilot switch in that order to terminate said low voltage starting cycle.

17. The internal combustion engine starting system claimed in claim 14, wherein:

said voltage sensing means comprises means for latching said trip signal into on state so that said terminating means maintains said starting cycle off so that the latter cannot be restarted until said start signal is removed and reapplied.

18. The internal combustion engine starting system claimed in claim 10, wherein:

said predetermined operating condition is an undesired reselection of a series or parallel batteries starting mode after the previously selected starting mode cycle has begun thereby causing a momentary interruption of the starting mode state;

said condition sensing means comprises means for sensing said interruption of starting mode state and providing a trip signal;

and said terminating means responds to said trip signal to terminate said starting cycle.

19. The internal combustion engine starter system claimed in claim 1, wherein said control means also comprises:

means for sensing the voltage of said operating power supplied by said first battery to said system;

means operable when series batteries starting mode has been selected and responsive to said sensing means sensing that said voltage is below a minimum value required for system operation for connecting the higher voltage of said series connected batteries to said system to insure adequate operating voltage under adverse conditions.

20. In a system for starting an internal combustion engine having a starter motor and a standard starter solenoid including a pull coil and a hold coil and standard contacts, the system comprising:

a first battery for supplying operating power to the system and a second battery;

first switching means for connecting said first and second batteries in parallel for normal weather starting;

second switching means for connecting said first and second batteries in series for cold weather starting;

a starter pilot switch in circuit with said batteries for energizing the pull and hold coils of the standard starter solenoid;

a starter motor switch in circuit with said batteries and said standard solenoid contacts for energizing said starter motor;

means for selecting a series or parallel batteries starting mode;

means for applying a start signal;

and timing means comprising a single timing device responsive to said start signal and sequencing means responsive thereto for opening said first switching means and then closing in predetermined timed sequence said second switching means, said starter pilot switch and said starter motor switch in that order in the event series batteries starting was selcted;

means responsive to termination of said start signal for opening said second switching means;

and said single timing device being responsive to termination of said start signal and said sequencing means being responsive thereto for opening in predetermined timed sequence said starter motor switch and said starter pilot switch in that order and thereafter reclosing said second switching means.

21. The internal combustion engine starting system claimed in claim 20, wherein:

said first and second switching means comprise interlocking means so that they can be closed alternately but not concurrently thereby to prevent short-circuiting said batteries.

22. The internal combustion engine starting system claimed in claim 20, wherein:

said first and second switching means are mechanically interlocked electromagnetic contactors whereby only one of said contactors can be closed at a time;

and said system also comprises:

means operable after termination of said start signal for sensing whether said second electromagnetic contactor has failed to open as by welding of its contacts whereby said sensing means detects a signal coming from one of said batteries therethrough;

and means responsive to said signal for preventing energization of said electromagnetic contactor of said first switching means.

23. The internal combustion engine starting system claimed in claim 22, wherein:

said starter pilot switch is an electromagnetic relay;

and said system also comprises:

second means operable after termination of said start signal for sensing whether said electromagnetic relay has failed to open as by welding of its contacts whereby said second sensing means detects a second signal coming therethrough;

and means responsive to said second signal for preventing energization of said electromagnetic contactor of said first switching means.

* * * * *